(12) United States Patent
Kaluskar et al.

(10) Patent No.: US 7,092,931 B1
(45) Date of Patent: Aug. 15, 2006

(54) METHODS AND SYSTEMS FOR DATABASE STATEMENT EXECUTION PLAN OPTIMIZATION

(75) Inventors: Sanjay Kaluskar, Mountain View, CA (US); Namit Jain, Emeryville, CA (US); Hakan Jakobsson, San Fransicso, CA (US); Graham S. Wood, El Granada, CA (US)

(73) Assignee: Oracle Corporation, Redwood Shores, CA (US)

( * ) Notice: Subject to any disclaimer, the term of this patent is extended or adjusted under 35 U.S.C. 154(b) by 194 days.

(21) Appl. No.: 10/144,681

(22) Filed: May 10, 2002

(51) Int. Cl.
*G06F 7/00* (2006.01)
*G06F 17/30* (2006.01)
(52) U.S. Cl. .............................. 707/2; 707/4; 707/101
(58) Field of Classification Search .................... 707/2, 707/1, 4, 3, 104.1, 101
See application file for complete search history.

(56) References Cited

U.S. PATENT DOCUMENTS

| | | | |
|---|---|---|---|
| 5,404,510 A | 4/1995 | Smith et al. | |
| 5,412,804 A | 5/1995 | Krishna | |
| 5,495,608 A | 2/1996 | Antoshenkov | |
| 5,615,359 A | 3/1997 | Yung | |
| 5,664,172 A | 9/1997 | Antoshenkov | |
| 5,734,884 A | 3/1998 | Eberhard et al. | 707/2 |
| 5,758,144 A | 5/1998 | Eberhard et al. | 707/2 |
| 5,761,654 A | 6/1998 | Tow | |
| 5,802,521 A | 9/1998 | Ziauddin et al. | |
| 5,802,523 A | 9/1998 | Jasuja et al. | |
| 5,819,251 A | 10/1998 | Kremer et al. | |
| 5,822,748 A | 10/1998 | Cohen et al. | |
| 5,857,180 A | 1/1999 | Hallmark et al. | |
| 5,875,334 A * | 2/1999 | Chow et al. | 717/141 |
| 5,892,945 A | 4/1999 | Mirchandaney et al. | |
| 5,899,986 A | 5/1999 | Ziauddin | |
| 5,899,993 A | 5/1999 | Jenkins, Jr. | |
| 5,903,888 A | 5/1999 | Cohen et al. | |
| 5,907,844 A | 5/1999 | Guay et al. | |
| 5,956,705 A | 9/1999 | Stevens et al. | |
| 5,963,742 A | 10/1999 | Williams | 717/143 |
| 5,987,455 A * | 11/1999 | Cochrane et al. | 707/4 |
| 6,003,022 A | 12/1999 | Eberhard et al. | 707/2 |
| 6,009,265 A * | 12/1999 | Huang et al. | 707/3 |
| 6,014,656 A | 1/2000 | Hallmark et al. | |
| 6,026,391 A | 2/2000 | Osborn et al. | |
| 6,029,163 A | 2/2000 | Ziauddin | |
| 6,144,957 A | 11/2000 | Cohen et al. | |
| 6,219,660 B1 * | 4/2001 | Haderle et al. | 707/1 |
| 6,269,373 B1 | 7/2001 | Apte et al. | 707/10 |

(Continued)

OTHER PUBLICATIONS

Leverenz, Lefty et al., Oracle8 Server Concepts, 1997, pp. 13-1 to 13-19 and 19-1 to 19-68.

(Continued)

*Primary Examiner*—Greta Robinson
*Assistant Examiner*—Kuen S. Lu
(74) *Attorney, Agent, or Firm*—Bingham McCutchen LLP (57) ABSTRACT

The methods and systems for database statement execution plan optimization exploit bind variable data available on the network to build and optimize an execution plan for the statement. A system for database statement execution plan optimization comprises a bind variable analyzer, a frame allocator, and an optimizer, in addition to a parser for parsing and analyzing the statement, a type checker for type checking the statement, and a tree builder for building an expression tree.

38 Claims, 5 Drawing Sheets

U.S. PATENT DOCUMENTS

| | | |
|---|---|---|
| 6,351,742 B1 | 2/2002 | Agarwal et al. |
| 6,356,887 B1 | 3/2002 | Berenson et al. .............. 707/2 |
| 6,370,619 B1 | 4/2002 | Ho et al. |
| 6,374,257 B1 | 4/2002 | Guay et al. |
| 6,401,083 B1 | 6/2002 | Agarwal et al. |
| 6,421,662 B1 | 7/2002 | Karten |
| 6,370,522 B1 | 8/2002 | Antoshenkov |
| 6,439,783 B1 | 8/2002 | Antoshenkov |
| 6,457,007 B1 | 9/2002 | Kikuchi et al. .............. 707/10 |
| 6,470,423 B1 | 10/2002 | Ho et al. |
| 6,505,227 B1 | 1/2003 | Mirchandaney et al. |
| 6,546,394 B1 | 4/2003 | Chong et al. |
| 6,581,055 B1 | 6/2003 | Ziauddin et al. |
| 6,598,041 B1 | 7/2003 | Bernal et al. .................. 707/3 |
| 6,606,627 B1 | 8/2003 | Guthrie et al. |
| 6,615,206 B1 | 9/2003 | Jakobsson et al. |
| 6,643,637 B1 | 11/2003 | Chen et al. .................... 707/2 |
| 6,665,678 B1 | 12/2003 | Chen et al. ................. 707/100 |
| 6,694,305 B1 | 2/2004 | Bernal et al. .................. 707/2 |
| 6,721,731 B1 | 4/2004 | Cornwell et al. .............. 707/1 |
| 6,850,925 B1 * | 2/2005 | Chaudhuri et al. ............ 707/2 |
| 6,974,408 B1 | 12/2005 | Grosse-Wiesmann |
| 2003/0055813 A1 * | 3/2003 | Chaudri et al. ................. 707/3 |
| 2003/0120682 A1 * | 6/2003 | Bestgen et al. .......... 707/104.1 |
| 2003/0236780 A1 | 12/2003 | Saha et al. ..................... 707/3 |

OTHER PUBLICATIONS

Batory, Don, et al., "The Design and Implementation of Hierarchial Software with Reusable Components," ACM Transactions on Software Engineering and Methodolgy, (Oct. 1992), pp. 355-398, vol. 1, No. 4.

Graefe, Goetz, "Query Evaluation Techniques for Large Databases," ACM Computing Surveys, (Jun. 1993), pp. 73-170, vol. 25, No. 2.

Hindmarsh, Jon, et al., "Fragmented Interaction: Establishing mutual orientation in virtual environments," Proceedings of the 1998 ACM conference on Computer supported cooperative work, (Nov. 1998), pp. 217-226.

Michael, Maged M., "High Performance Lock-Free Hash Tables and List-Based Sets," Proceediings of the fourteenth annual ACM symposiumon Parallel algorithms and architectures (Aug. 2002), pp. 73-82.

Michael, Maged M., "Safe Memory Reclamation for Dynamic Lock-Free Objects Using Atomic Reads and Writes," Proceedings of the twenty-first annual symposium on Principles of distributed computing (Jul. 2002), pp. 21-30.

Ramduny, Devina, et al., "Exploring the design space for notification servers," Proceedings of the 1998 ACM conference on Computer supported cooperative work, (1998), pp. 227-236.

Viera, Humberto, et al., "XVerter: Querying XML Data with OR-DBMS," Proceedings of the fifth ACM international workshop on Web Information and data management, (Nov. 2003), pp. 37-44.

Zhu, Yali, et al., "Dynamic Plan Migration for Continuous Queries Over Data Streams," SIGMOD Conference (2004), pp. 431-442.

Anonymous, "Oracle 8i Designing and Tuning for Performance," Release 2 (8.1.6), (Dec. 1999), Chapter 19, pp. 12-18; http://downloaded-west.oracle.com/docs/cd/A81042_01DOC/server.816/a76992/ch19_mem.htm and Chapter 127, pp. 26, http://downloat_west.oracle.com/docs/cd/A81042_01/DOC/server.816/a76961/ch127.htm.

* cited by examiner

METHODS AND SYSTEMS FOR DATABASE STATEMENT EXECUTION PLAN OPTIMIZATION

FIELD OF THE INVENTION

This application relates generally to database statement execution plans, and more particularly relates to methods and systems for database statement execution plan optimization.

BACKGROUND

In modern relational database management systems (RDBMS), the overhead associated with processing client requests can be troublesome. Cache and buffer overflow, I/O bottlenecks, wasted CPU cycle time, shared memory latch contention, network throughput, and other performance side effects often result from poor planning and untested design.

To avoid these and other by-products of a poorly designed system, a client/server DBMS architecture could benefit greatly from a streamlined database statement processing system. In a typical two-tier DBMS architecture, a client issues a database statement (hereinafter illustratively referred to as a "SQL statement") to a process running on the database server through a proprietary or open-system call level interface (CLI). The server expends a great deal of its run-time resources in parsing the request, creating an execution tree, semantically analyzing the statement, and determining an optimal execution plan. These steps together constitute the compilation, or "hard parse," steps needed to store and create a "cursor" in cache memory before the server can effectively carry out a client request or return a result set. A cursor is a handle to a query execution area, e.g., an area in memory in which a parsed SQL statement and other information for processing the SQL statement is stored.

Database systems frequently invoke an optimizer to handle the task of creating an execution plan that is optimized to a particular SQL statement. For the most part, optimizing a SQL statement is a manageable task; however, SQL statements written with "bind" variables often present a challenge to the optimizer because the optimal execution plan for such a statement will likely differ from one bind value to another. A bind variable is a placeholder, e.g., for literal values, in a query sent to a server. Previous approaches to optimizing SQL statement execution plans in the face of one or more bind variables written into the statement involved providing the optimizer with a suggestion embedded in the command-line, or rewriting the statement with constants in place of bind variables. The latter approach is undesirable because it suggests defeat of the purpose for using bind variables in the first place, while the former technique requires that a developer or user have pre-existing knowledge of the optimizer's functionality-neither approach is very effective.

The methods and systems for database statement execution plan optimization minimize or eliminate the inherent limitations and drawbacks of current optimization techniques by permitting a database statement issued from a client to be optimized based on one or more bind values.

In one embodiment, the methods and systems for database statement execution plan optimization comprise a frame allocator for allocating space in memory for executing a SQL statement execution plan and a bind value analyzer for peeking at the value of one or more bind variables. A type checker, optimizer, and parser are also provided for type checking, parsing, and optimizing a SQL statement, respectively.

The methods and systems for database statement execution plan optimization offer several advantages, including: enhanced SQL processing performance without costly code revision, better execution plan optimization that utilizes actual bind variable data, and improved processing efficiency for SQL statements with one or more bind variables.

Further details of aspects, objects, and advantages of the invention are described in the detailed description, drawings, and claims.

DETAILED DESCRIPTION OF THE PREFERRED EMBODIMENTS

The methods and systems for database statement execution plan optimization overcome the aforementioned optimization difficulties by peeking at a bind value in advance of execution plan compilation and optimizing an execution plan based on the value. As a result, the methods and systems for database statement execution plan optimization avoid application code modification while generally producing a more optimal plan for database statements with one or more bind variables.

The first time a database statement is processed by a server, it is usually compiled. Compilation is a multi-stage process beginning with a parse and ending with an execution plan as further described below. The compilation process is often referred to as a "hard parse" due to the sheer amount of work (i.e., in the form of function calls, routine invocations, memory accesses, etc.) involved to accomplish the task. The statement is usually cached in a shared memory pool where the statement is reused for all subsequent executions of the statement. Once hard parsed and cached, subsequent uses of the statement are referred to as a "soft parse."

Figure 1:
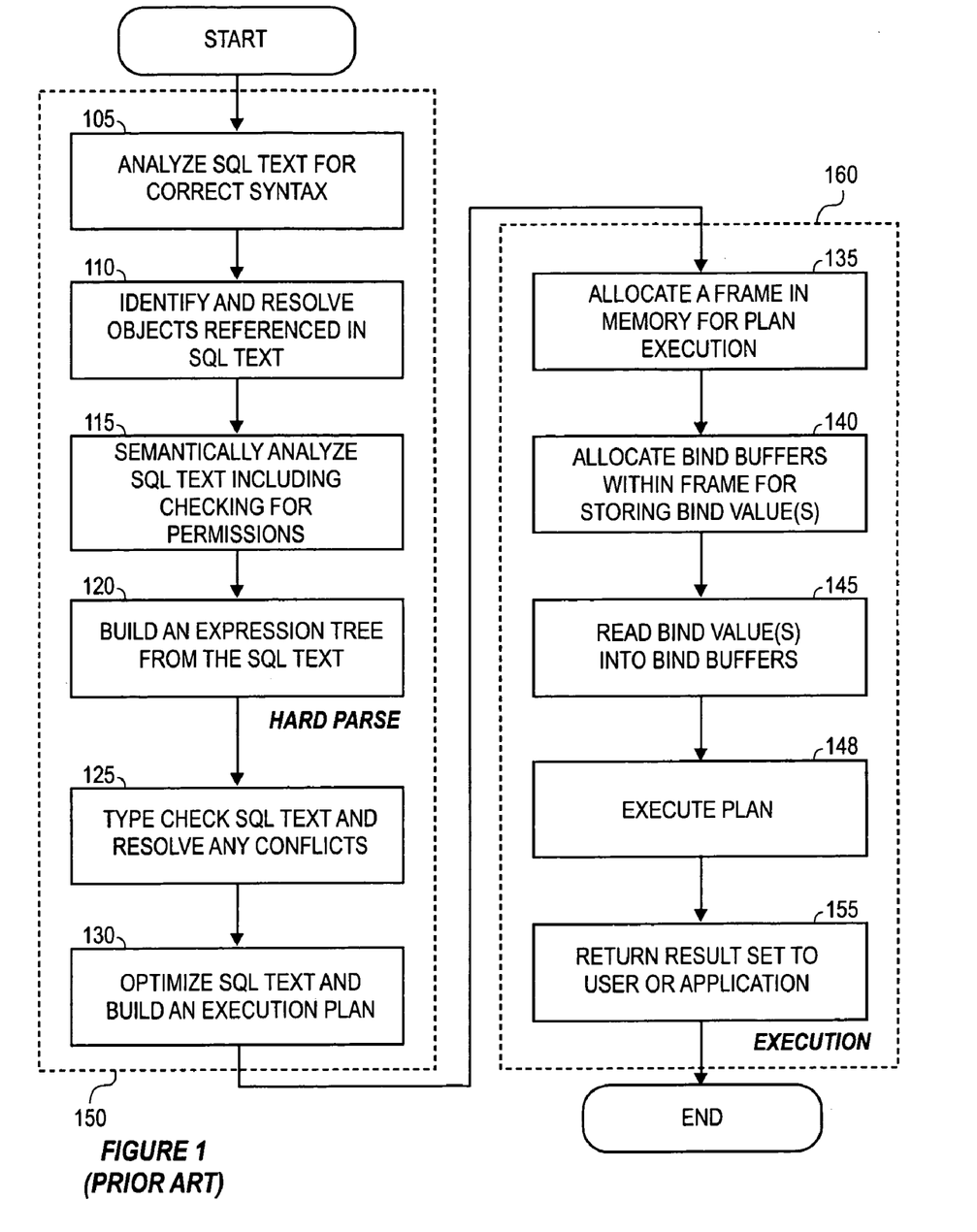
FIG. 1 is a flow diagram illustrating an example process for compiling a cursor.

FIG. 1 is a flow diagram illustrating the basic SQL statement compilation steps according to an embodiment. In this embodiment, the database statement is a SQL statement and compilation begins with parse phase 150. Parse phase 150 is so named because the SQL statement is analyzed and parsed clause by clause into its constituent components creating an expression tree (sometimes called a parse tree). The expression tree is effectively the SQL statement mapped to a new data structure and is eventually what gets traversed later during execution phase 160. Parse phase 150 can consist of steps 105–130, depending on the SQL implementation.

Parse phase 150 involves syntactical analysis, step 105, where the statement is analyzed for correct syntax, followed by step 110, where among other things, a determination is made whether the referenced objects exist. In step 115, user permissions are analyzed by the semantic analyzer to determine if the client holds access privileges to the specific objects referenced in the SQL text. An expression tree for the SQL text is developed in step 120. The type checking stage 125 engages data type resolution between a client process and a server process, which verifies and corrects data type incompatibilities that can exist, for example, in a heterogeneous enterprise client/server network. For example, a user process (client) running on Windows NT against an Oracle Corporation ("Oracle") database running on MVS (multiple virtual storage) would require data type resolution between ASCII and EBCDIC.

An objective of SQL statement compilation is the development of an execution plan in step 130. The execution plan is the result of optimization by an optimizer running as a separate process on the server. The optimizer accepts a parsed and analyzed statement from parse phase 150 and figures out the best method of execution for the particular statement based on a number of criteria, including: statistical information gathered during syntactical analysis (step 110) and semantic analysis (step 115); selectivity of the statement if the statement happens to be a DML (data manipulation language) statement; and optimization methodologies, such as cost-based optimization (CBO), rule-based optimization (RBO), and/or activity based optimization (ABO). The result of a hard parse is a memory-resident data structure, which dictates to the server, by way of the execution plan, the best method for carrying out the database statement request. A cursor is one example of such a data structure that is essentially a handle to a memory location where the details and results of a parsed and optimized database statement reside. The cursor comprises, among other things, a compiled SQL statement with its associated execution plan. A cursor in this context resides in the server's shared memory pool and as such, it must be distinguished from the use of the term cursor from other data processing contexts, such as client-side procedural language originated cursors used to aid data table processing.

After hard parse compilation, execution phase 160 begins, which encompasses frame allocation 135, bind variable resolution 140 and 145, plan execution 148, and the return of a result set 155. In step 135, a frame in memory is allocated for executing the cursor compiled in parse phase 150. Bind variable resolution steps 140 and 145 are where values for bind variables that are referenced in the SQL statement are resolved. Bind values are substituted into the execution plan at execution time (step 145). For example, the following statement:

SELECT*FROM EMP_T WHERE
EMP_T.EMPLOYEE_ID<:X

":X" is a bind variable whose value (i.e., 100, 200, etc.) is different depending on the specific invocation of the statement. A bind variable is placeholder element within a SQL statement. Any suitable element can be employed as a placeholder. In this embodiment, bind variables are acting as the placeholder element.

In step 140, bind buffers are allocated within the frame for storing bind values and in step 145, bind values corresponding to the bind variables for the particular execution instance are read into the buffers. Finally, the statement is executed in step 148 and a result set is returned to the user or application in step 155 if the statement is a DML statement.

Placeholders, such as bind variables, are typically used by developers when writing a SQL statement that will be executed multiple times, each time with a potentially different value, for instance, in a WHERE clause, as above. Bind variables are a simple, useful tool for the application developer. However, optimizing a SQL statement with a bind variable is often a challenge for the optimizer.

Optimization is an expensive operation. Hence, it is often impractical to optimize a statement more than one time. As a result, an execution plan is built the first time a SQL statement is run and is typically reused for each subsequent invocation of that statement. For SQL statements having only constants and no bind variables, optimization poses little difficulty. However, when a SQL statement is written with one or more bind variables, the execution plan is typically not optimized for any particular value of the bind variable. Referring to the SQL statement above, for example, the optimizer would optimize the statement without any prior knowledge of the specific values (i.e., 100, 200, etc.) that might be later substituted for the variable :X. As a result, an execution plan built for a statement having bind variables may well perform worse as compared to an execution plan built for the same statement having specific literals in place of the variables.

Optimizers are usually unable to effectively optimize a SQL statement unless the optimizer has access to statistical information about the distribution of the underlying table data. Statistical information about value distributions in columns is often unhelpful if bind value data is inaccessible. Bind value data may be needed to make comparisons between the bind value and the table data-comparisons that would be useful in making a judgment whether an index or a full table scan would produce a better plan, for instance. During optimization, the prior knowledge of a bind value, for example, a first value 100 for EMPLOYEE_ID in the sample statement above could mean that a full table scan would be more efficient than using an index to return the result set. On the other hand, a bind value of 200 for EMPLOYEE_ID might produce better efficiency with an index scan as part of the execution plan. With prior knowledge of the bind value, the methods and systems for database statement execution plan optimization are better able to optimize a SQL statement. The unavailability of bind values at the optimization stage can thus be a serious drawback to the development of an optimal execution plan.

Another drawback to the method of FIG. 1 is the optimizer's disregard of the bind variable data often sitting in the lower-level network layers ignored by the optimizer because bind variable metadata alone are used in the method of FIG. 1 to type check and build the cursor. Not until execution time are the bind variables bound (i.e., substituted) for their respective values. By rearranging the rigid step-by-step methodology of FIG. 1, the methods and systems for database statement execution plan optimization are able to peek at the bind values. Bind value peeking is further facilitated by an enhanced scheme of frame allocation whereby the frame allocator allows the bind variable analyzer to search the network physical layer for a bind value before completing frame allocation as further described below.

Figure 2:
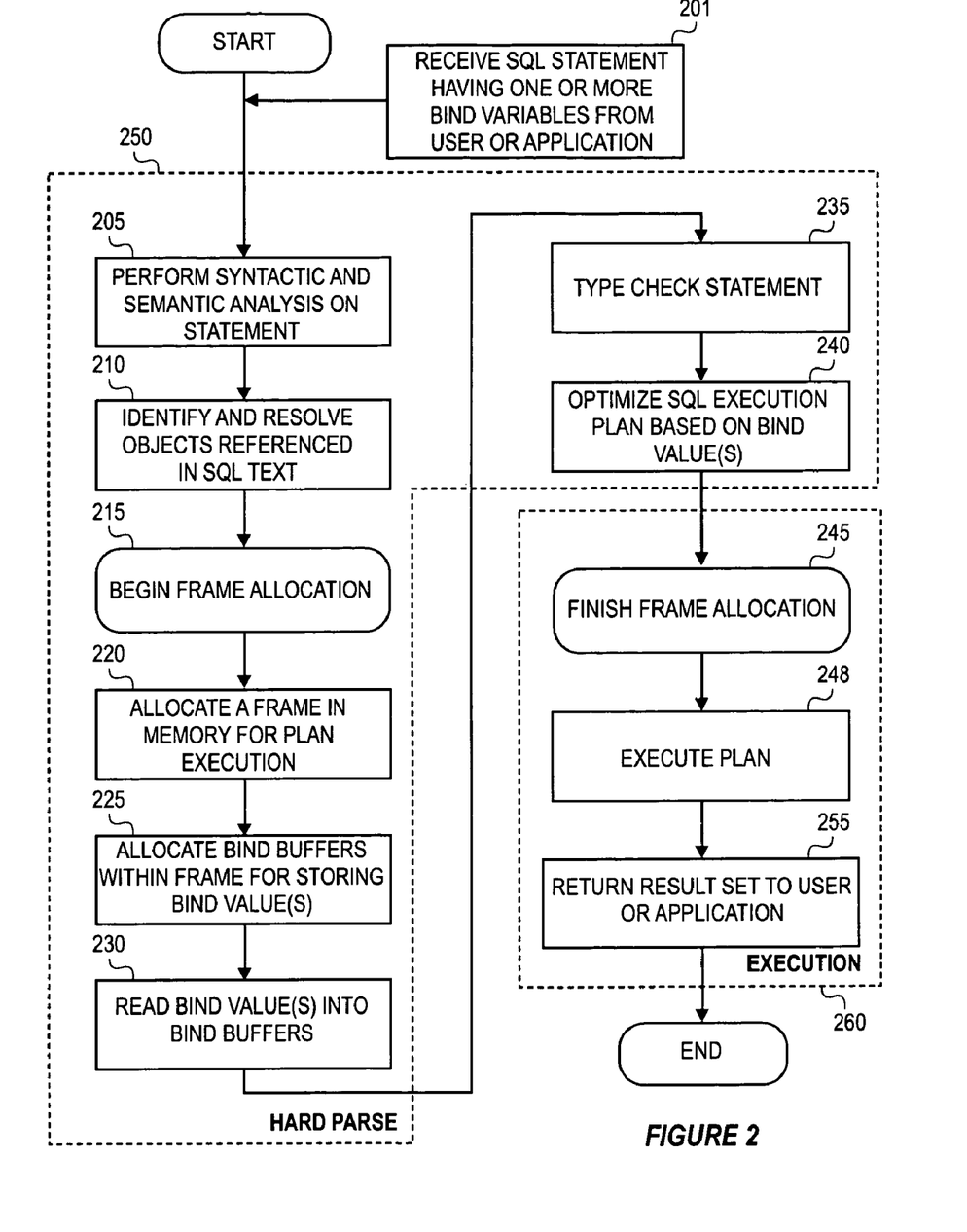
FIG. 2 is a flow diagram exemplifying a method for optimizing a SQL statement execution plan according to one embodiment.

FIG. 2 exemplifies a method for SQL statement execution plan optimization showing the process of peeking at one or more bind values in accordance with an embodiment. Beginning in step 201, a server receives an incoming SQL statement from a user or application, the statement having one or more bind variables. Hard parse phase 250 initiates the cursor building process. The SQL statement may be, for instance, an ad-hoc query or a DDL (data definition language) or DML request bundled within an OLTP (on-line transaction processing) application. Steps 205 and 210 perform the syntactic and semantic analysis and object resolution, respectively, as previously described with respect to steps 105 and 110 of FIG. 1. Step 215 represents a significant departure from the frame allocation process formerly comprising a single step 135 in FIG. 1. By moving the initial stages of frame and bind buffer allocation (steps 135 and 140) into hard parse phase 250, optimization step 240 is aided by knowledge of specific bind values discovered in step 230 and read into the buffers allocated for their storage in step 225.

Type checking 235 and optimization 240 occur after frame allocation 220 and buffer allocation 225. After optimization in step 240, in which one or more bind values are used by the optimizer to produce a plan, frame allocation is completed in step 245. In step 248 the plan is executed. If the execution plan created for the incoming SQL statement is one that should produce a result set, that result will be set to the user or application in step 255.

Figure 3:
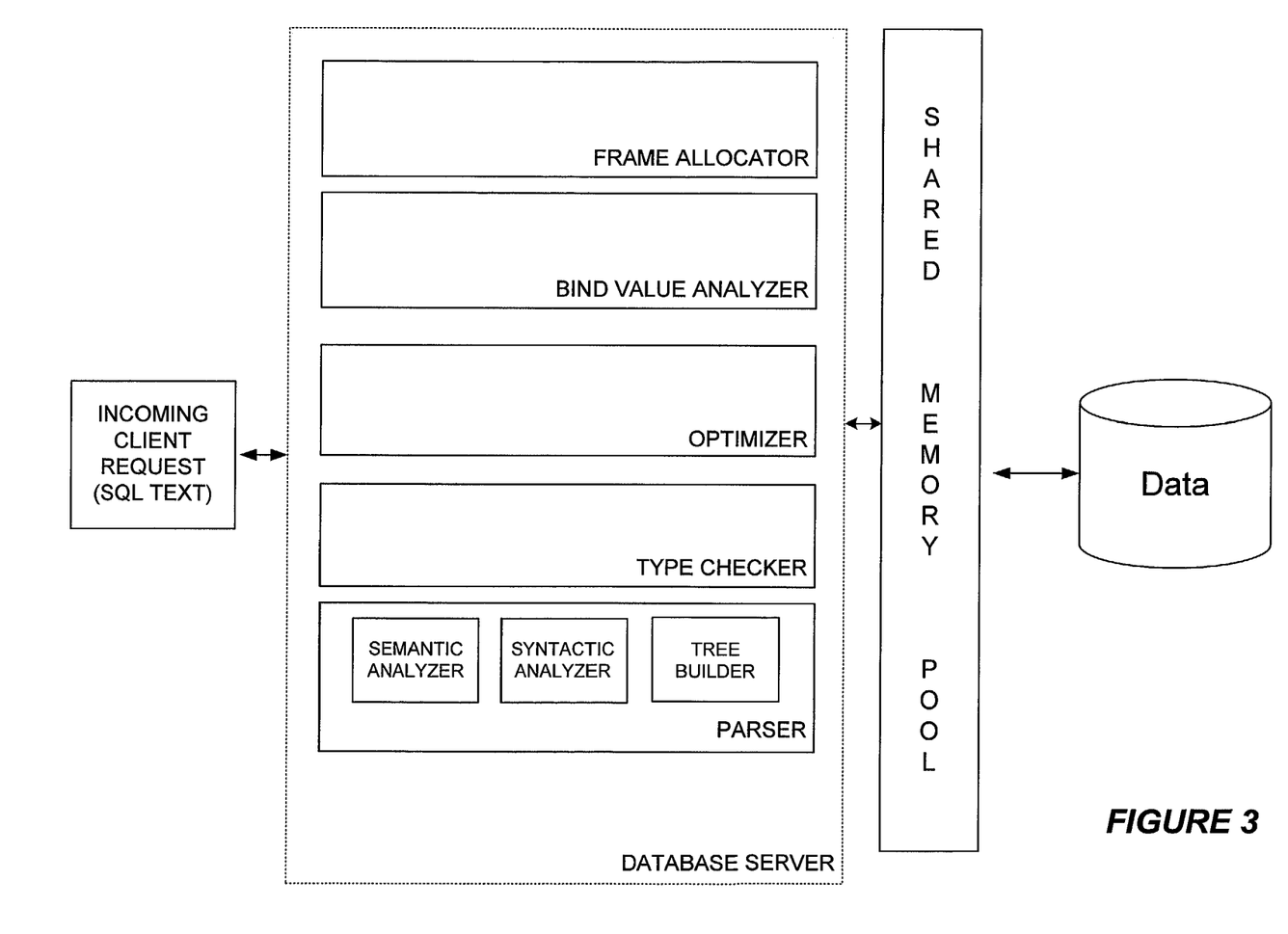
FIG. 3 is a block diagram exemplifying a system for SQL statement execution plan optimization according to one embodiment.

FIG. 3 is an exemplary block diagram of the modules comprising the methods and systems for database statement execution plan optimization according to one embodiment. The database server comprises a compiler, a frame allocator, and a bind variable analyzer, each of which interact with the shared memory pool. The shared memory pool is the portion of system cache where open cursors are manipulated during processing. The shared memory pool can be, for example, the Oracle shared pool area.

The database server responds to incoming client requests in the form of SQL statements and controls cooperative interaction among the database server modules. The frame allocator module sets aside a portion of the shared memory pool to be used for plan execution, in addition to allocating space for bind variables and other local variables as needed during statement execution. The bind value analyzer is responsible for retrieving bind variable data for use by the optimizer in optimizing an execution plan. Bind variable data typically resides in a network physical layer buffer or other low-level system storage area. The optimizer manages execution plan optimization based on the bind values that the bind value analyzer has access to. The type checker and parser (comprising a semantic analyzer, a syntactic analyzer, and a tree builder) are responsible for carrying out the functionality of steps 105–120 as explained earlier with respect to FIG. 1 and also with respect to steps 205 and 210 of FIG. 2.

Figure 4:
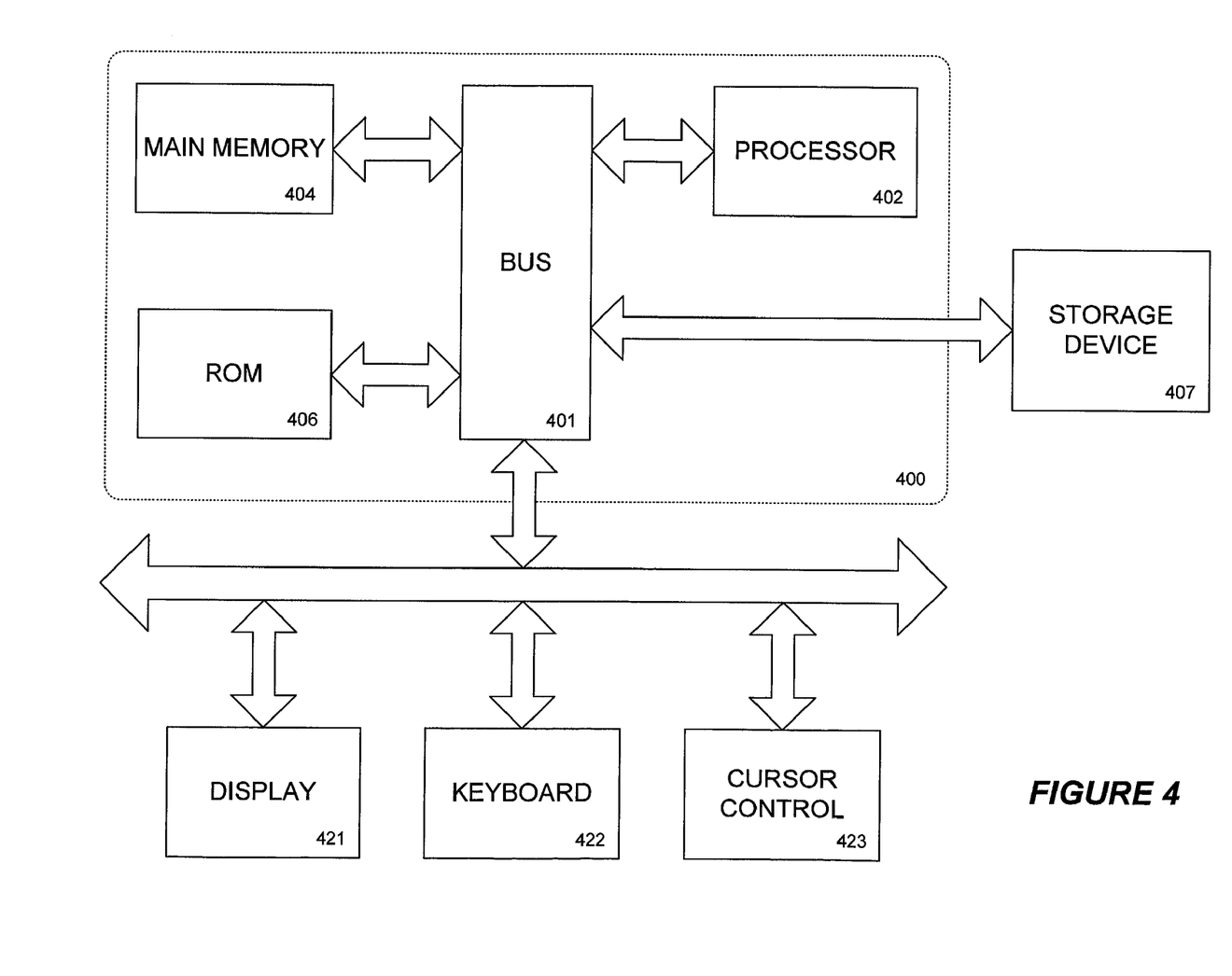
FIG. 4 is a block diagram of an exemplary computer system that can be used in an implementation of the methods and systems for database statement execution plan optimization according to one embodiment.

FIG. 4 is an exemplary block diagram of a computer system 400 upon which the methods and systems for database statement execution plan optimization can be implemented. Computer system 400 includes a bus 401 or other communication mechanism for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 can also be used for storing temporary variables or other intermediate information during execution of instructions by processor 402. Computer system 400 also comprises a read only memory (ROM) and/or other static storage device 406 coupled to bus 401 for storing static information and instructions for processor 402. Data storage device 407, for storing information and instructions, is connected to bus 401.

A data storage device 407 such as a magnetic disk or optical disk and its corresponding disk drive can be coupled to computer system 400. Computer system 400 can also be coupled via bus 401 to a display device 421, such as a cathode ray tube (CRT), for displaying information to a computer user. Computer system 400 can further include a keyboard 422 and a pointer control 423, such as a mouse. The methods and systems for database statement execution plan optimization can be deployed on computer system 400 in a stand-alone environment or in a client/server network having multiple computer systems 400 connected over a local area network (LAN) or a wide area network (WAN).

Figure 5:
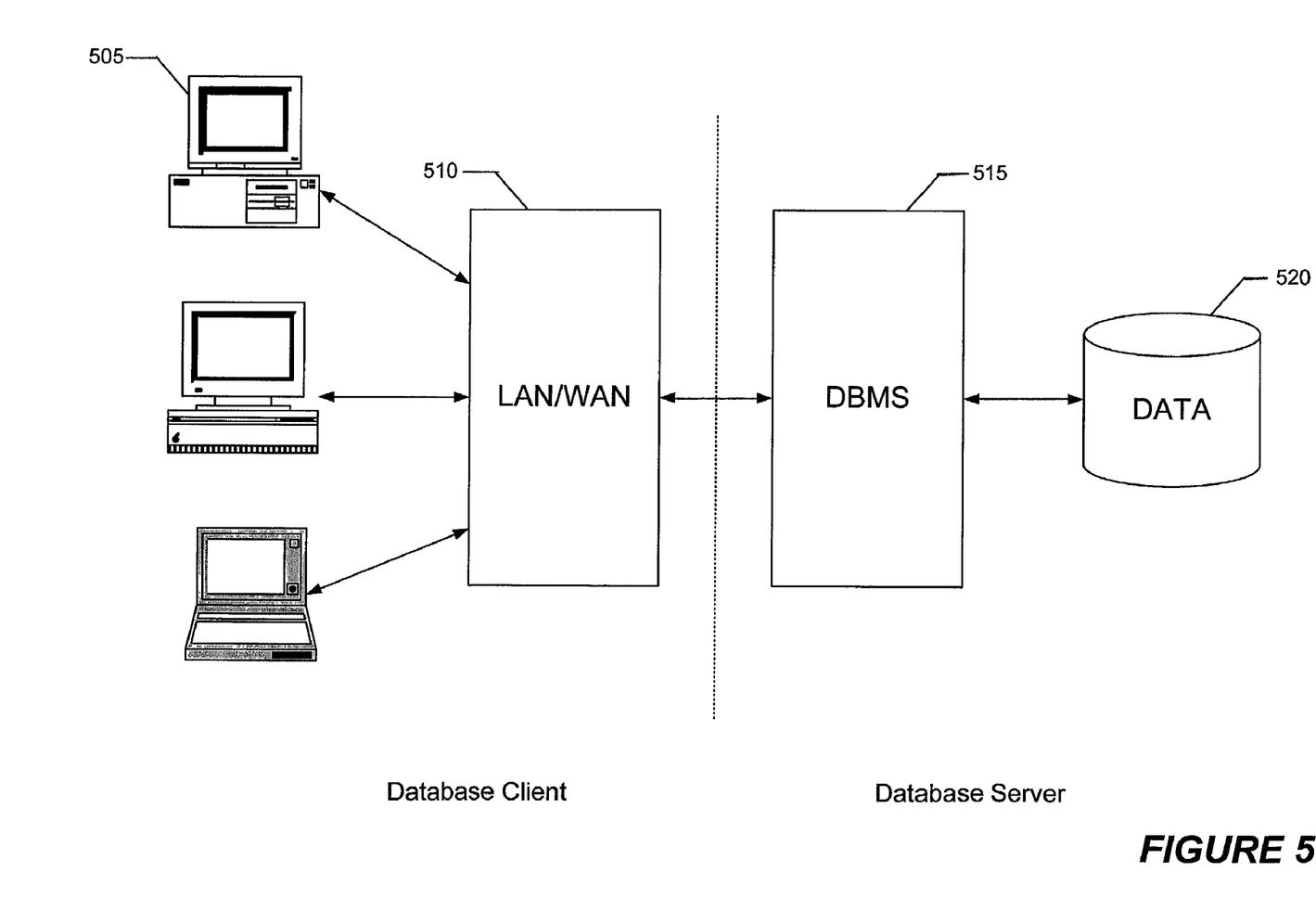
FIG. 5 is a block diagram of an exemplary two-tier client/server system that can be used to implement the methods and systems for database statement execution plan optimization according to one embodiment.

FIG. 5 is a simplified block diagram of a two-tiered client/server system upon which the methods for database statement execution plan optimization can be deployed. Each of client computer systems 505 can be connected to the database server via connectivity infrastructure that employs one or more LAN standard network protocols (i.e., Ethernet, FDDI, IEEE 802.11) and/or one or more public or private WAN standard networks (i.e., Frame Relay, ATM, DSL, T1) to connect to a database server running DBMS 515 against data store 520. DBMS 515 can be, for example, an Oracle RDBMS such as ORACLE 9i. Data store 520 can be, for example, any data store or warehouse that is supported by DBMS 515. The methods and systems for database statement execution plan optimization are scalable to any size, from simple stand-alone operations to distributed, enterprise-wide multi-terabyte applications.

In one embodiment the methods and systems for database statement execution plan optimization are performed by computer system 400 in response to processor 402 executing sequences of instructions contained in memory 404. Such instructions can be read into memory 404 from another computer-readable medium, such as data storage device 407. Execution of the sequences of instructions contained in memory 404 causes processor 402 to perform the process steps earlier described. In alternative embodiments, hard-wired circuitry can be used in place of or in combination with software instructions to implement the present invention. Thus, the methods and systems for database statement execution plan optimization are not limited to any specific combination of hardware circuitry and software.

The methods and systems for database statement execution plan optimization can be implemented as a direct improvement over existing systems and methods for ad-hoc SQL processing, as described herein. However, the present invention contemplates as well the enhancement of other DBMS sub-systems and interfaces including, by way of example, necessary modifications to one or more proprietary procedural languages, such as Oracle PL/SQL, or code-level adjustments or add-ons to a proprietary or open-system architecture such as Java stored programs, needed to extend the functionality of the present invention. This and other similar code modifications may be necessary to a successful implementation and it is fully within the contemplation of the present invention that such modified or additional code be developed.

What is claimed is:

1. A method for executing an execution plan comprising:
    compiling a database statement before the database statement is executed, wherein the database statement is compiled by
        obtaining a value of a database statement placeholder prior to execution, and
        optimizing said execution plan based on said value; and
        executing said execution plan;

wherein said value is obtained by:
allocating a frame in a memory,
allocating a buffer within said frame, and
reading said value into said buffer.

2. The method of claim 1, wherein said memory is for execution of said database statement.

3. The method of claim 1, further comprising parsing said database statement.

4. The method of claim 1, further comprising performing semantic and syntactic analysis on said database statement.

5. The method of claim 1, wherein said value is from a request to execute the database statement.

6. The method of claim 1, further comprising using the execution plan for a subsequent invocation of the database statement with a different value.

7. A system for executing an execution plan comprising:
logic for compiling a database statement before the database statement is executed, wherein the logic for compiling the database statement comprises
logic for obtaining a value of a database statement placeholder prior to execution, and
logic for optimizing said execution plan based on said value; and
logic for executing said execution plan;
wherein said logic for obtaining the value comprises
logic for allocating a frame in a memory,
logic for allocating a buffer within said frame, and
logic for reading said value into said buffer.

8. The system of claim 7, wherein said memory is for execution of said database statement.

9. The system of claim 7, wherein said value is from a request to execute the database statement.

10. The system of claim 7, further comprising logic for allowing the execution plan to be used for a subsequent invocation of the database statement with a different value.

11. A computer readable medium having stored thereon one or more sequences of instructions for controlling execution of one or more processors and for executing an execution plan, the one or more sequences of instructions comprising instructions for:
compiling a database statement before the database statement is executed, wherein the database statement is compiled by
obtaining a value of a database statement placeholder prior to execution, and
optimizing said execution plan based on said value; and
executing said execution plan;
wherein said value is obtained by
allocating a frame in a memory,
allocating a buffer within said frame, and
reading said value into said buffer.

12. The computer readable medium of claim 11, wherein said memory is for execution of said database statement.

13. The computer readable medium of claim 11, wherein said value is from a request to execute the database statement.

14. The computer readable medium of claim 11, further comprising instruction for using the execution plan for a subsequent invocation of the database statement with a different value.

15. A method for optimizing an execution plan comprising:
receiving a statement including a bind variable;
compiling the statement before the statement is executed, wherein the statement is compiled by
parsing the statement, the parsing comprising:
performing semantic and syntactic analysis on the statement, and
performing type checking on the statement; and
reading a bind value of the bind variable, the reading including:
allocating frames for the bind variable,
allocating buffers in the frames, and
reading the bind value into the buffer; and
optimizing the statement using the bind value, wherein the reading and the optimizing occur prior to performing the type checking on the statement.

16. The method of claim 15, wherein the bind value is stored in a network buffer.

17. The method of claim 15, further comprising allocating a frame in a memory for execution of said statement.

18. The method of claim 15, wherein the bind value is the first value of the bind variable.

19. The method of claim 15, further comprising executing said execution plan.

20. The method of claim 15, wherein the semantic analysis includes verifying user permissions and access privileges for one or more objects referenced in the database statement.

21. The method of claim 15, wherein the parsing further comprises building an expression tree from said database statement.

22. The method of claim 15, wherein the syntactic analysis includes checking the syntax of said database statement.

23. A computer readable medium having stored thereon one or more sequences of instructions for controlling execution of one or more processors and for optimizing an execution plan, the one or more sequences of instructions comprising instructions for:
receiving a statement including a bind variable;
compiling the statement before the statement is executed, wherein the statement is compiled by
parsing the statement, the parsing comprising:
performing semantic and syntactic analysis on the statement, and
performing type checking on the statement, and
reading a bind value of the bind variable, the reading including:
allocating frames for the bind variables,
allocating buffers in the frames, and
reading the bind value into the buffer; and
optimizing the statement using the bind values, wherein the reading and the optimizing occur prior to performing the type checking on the statement.

24. The computer readable medium of claim 23, wherein the bind value is stored in a network buffer.

25. The computer readable medium of claim 23, further comprising allocating a frame in a memory for execution of said statement.

26. The computer readable medium of claim 23, wherein the bind value is the first value of the bind variable.

27. The computer readable medium of claim 23, further comprising executing said execution plan.

28. The computer readable medium of claim 23, wherein the semantic analysis includes verifying user permissions and access privileges for one or more objects referenced in the database statement.

29. The computer readable medium of claim 23, wherein the parsing further comprises building an expression tree from said database statement.

30. The computer readable medium of claim 23, wherein the syntactic analysis includes checking the syntax of said database statement.

31. A system for optimizing an execution plan comprising:
   means for receiving a statement including a bind variable;
   means for compiling the statement before the statement is executed, the means for compiling the statement comprising:
      means for parsing the statement, the means for parsing comprising:
         means for performing semantic and syntactic analysis on the statement, and
         means for performing type checking on the statement, and
      means for reading a bind value of the bind variable, the means for reading including:
         means for allocating frames for the bind variable,
         means for allocating buffers in the frames, and
         means for reading the bind value into the buffer; and
      means for optimizing the statement using the bind values, wherein the reading and the optimizing occur prior to performing the type checking on the statement.

32. The system of claim 31, wherein the bind value is stored in a network buffer.

33. The system of claim 31, further comprising means for allocating a frame in a memory for execution of said statement.

34. The system of claim 31, wherein the bind value is the first value of the bind variable.

35. The system of claim 31, further comprising means for executing said execution plan.

36. The system of claim 31, wherein the means for semantic analysis include means for verifying user permissions and access privileges for one or more objects referenced in the database statement.

37. The system of claim 31, wherein the means for parsing further comprises means for building an expression tree from said database statement.

38. The system of claim 31, wherein the means for syntactic analysis includes means for checking the syntax of said database statement.

* * * * *

UNITED STATES PATENT AND TRADEMARK OFFICE
CERTIFICATE OF CORRECTION

PATENT NO. : 7,092,931 B1
APPLICATION NO. : 10/144681
DATED : August 15, 2006
INVENTOR(S) : Kaluskar et al.

It is certified that error appears in the above-identified patent and that said Letters Patent is hereby corrected as shown below:

On title page, in Item 56, in column 1, under "U.S. Patent Documents", line 4, after "Yung" insert -- 707/10 --.

On title page, in column 2, under "U.S. Patent Documents", after line 10, insert -- 5,974,408   10/26/1999 Cohen et al. --.

On page 2, in column 1, under "U.S. Patent Documents", line 7, after "6,370,522 B1" delete "8/2002 Antoshenkov" and insert -- 4/2002 Agarwal et al. --, therefor.

On page 2, in column 1, under "U.S. Patent Documents", line 23, after "3/2003" delete "Chaudri et al." and insert -- Chaudhuri et al. --, therefor.

On page 2, in column 1, under "Other Publications", line 1, delete "Hierarchial" and insert -- Hierarchical --, therefor.

On page 2, in column 1, under "Other Publications", line 2, after "Software" insert -- Systems --.

On page 2, in column 1, under "Other Publications", line 3, delete "Methodolgy," and insert -- Methodology, --, therefor.

On page 2, in column 2, under "Other Publications", line 9, delete "Proceediings" and insert -- Proceedings --, therefor.

On page 2, in column 2, under "Other Publications", line 10, delete "symposiumon" and insert -- symposium on --, therefor.

On page 2, in column 2, under "Other Publications", line 26, delete "downloaded" and insert -- download --, therefor.

On page 2, in column 2, under "Other Publications", line 28, delete "downloat" and insert -- download --, therefor.

In column 5, line 21, after "that result" insert -- set --.

In column 5, line 21, delete "be set" and insert -- be sent --, therefor.

In column 8, line 4, in claim 15, delete "statement;" and insert -- statement, --, therefor.

CERTIFICATE OF CORRECTION (continued)
U.S. Pat. No. 7,092,931 B1

In column 8, line 43, in claim 23, delete "variables," and insert -- variable, --, therefor.

Signed and Sealed this

Sixteenth Day of March, 2010

David J. Kappos
*Director of the United States Patent and Trademark Office*